May 11, 1948. T. D. MARTIN 2,441,160
COLLIMATING OPTICAL SIGHT WITH TRANSPARENT MIRROR MEANS
Filed Feb. 9, 1945
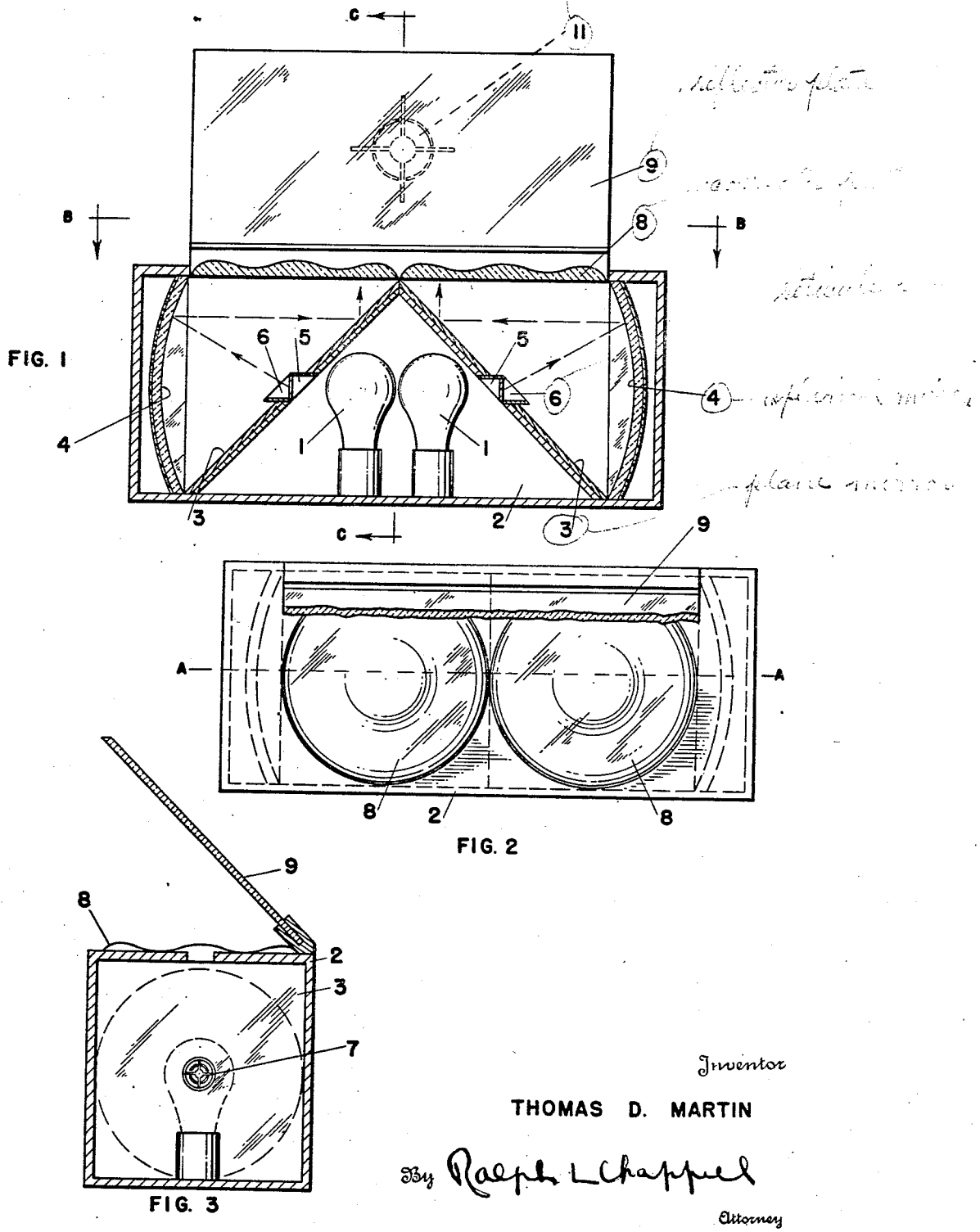
Inventor
THOMAS D. MARTIN
By Ralph L. Chappell
Attorney Patented May 11, 1948

2,441,160

UNITED STATES PATENT OFFICE 2,441,160

COLLIMATING OPTICAL SIGHT WITH TRANSPARENT MIRROR MEANS

Thomas D. Martin, United States Navy

Application February 9, 1945, Serial No. 576,998

2 Claims. (Cl. 88—2.6)

(Granted under the act of March 3, 1883, as amended April 30, 1928; 370 O. G. 757)

This invention relates to an improved optical gun sight particularly adapted for use on aircraft having guns mounted in fixed positions with respect to the craft. One well known sight consists of a sheet of transparent material, such as glass, mounted in the craft in such a position that the pilot can view the target through it. The target is visible through the transparent sheet just as though the sheet were not there. Because of the angle at which the transparent sheet is mounted, it catches and reflects to the eye the image of the reticle which is inserted within the sight. The optical system of this unit occupies much space which is essential to the operation of the aircraft. This old structure also produces an image of low luminosity.

The object of this invention is to provide a sight unit of the type described above which is compact and provides a clear image. Another object is to provide an optical system which may include a plurality of these sight units cooperating to project a single apparent image on a screen. A further object is to provide an optical gun sight utilizing a light source of reduced intensity. Still another object is to provide a simple system for producing an image with a minimum vertical dimension. Other objects of the invention will appear from an examination of the description and drawings wherein:

Fig. 1 is a rear view of the device in section along line A—A of Fig. 2;

Fig. 2 is a plan view of the invention broken along line B—B of Fig. 1; and

Fig. 3 is a view in section along line C—C of Fig. 1.

Reference is had to the accompanying drawings which illustrate two optical units and wherein like numerals refer to like parts throughout the figures. The source of light 1 positioned in the light tight box 2 is illustrated as a conventional incandescent lamp but any other source of high intensity may be employed. A plane mirror 3 or, as illustrated, a plurality of mirrors 3 disposed at an angle of 45° to the vertical are positioned in the box adjacent the light source. These mirrors are of such size and shape as to fit snugly in the box and shut out all light from the light source 1. A concave spherical mirror 4 or as illustrated in the drawing, a plurality of these mirrors are positioned in the box 2 with their axes normal to the vertical plane and intersecting the plane mirrors 3 which are perforated at the points of intersection of these axes to provide apertures 5. Plates 6 are mounted in apertures 5 in planes normal to the axes and with the center of the plate coincident with the axes. Openings 7 formed in these plates in the configuration of the reticle of a conventional gun sight provide the source of the luminous optical image and are positioned at the focal point of spherical mirror 4. Lenses of the type known as Schmidt corrector plates 8 are mounted in a horizontal plane in the top of box 2 in the path of light reflected from the concave spherical mirrors 4. These lenses correct the beam for spherical aberration and coma to provide clear cut edges to the image and they further assist in collimating the beam. A transparent plane reflector plate 9 is located on top of the box at a 45° angle to the vertical and in the path of beams of light projected from the various spherical mirrors and from which is reflected the apparent optical image 11. This plate is positioned so that the gunner looks through it in firing.

The operation of the device is as follows: Light from the source 1 is projected through reticule openings 7 in plates 6 against the spherical mirror 4. As the openings 7 are at the focal points of the spherical mirrors the images are reproduced at infinity. The direction of each beam is changed through an angle of 90° by the plane mirror 3 and projected on the transparent reflector plate 9. The Schmidt corrector plates 8 interposed in the paths of the beams are ground to present a clear image. The reflector plate 9 is transparent, by reason of which a large portion of the light from the reticule passes through it and is lost. However, the portion of light reflected in the direction of the eye of the operator produces an image at infinity. As each beam produces its image at infinity, the multiple images of the reticle will focus at infinity and will appear as a single image.

It will be understood that the above description and accompanying drawings comprehend only the general and preferred embodiment of the invention and that various changes in construction, proportion and arrangement of the parts may be made within the scope of the appended claims without sacrificing any of the advantages of the invention.

The invention described herein may be manufactured and used by or for the Government of the United States of America for governmental purposes without the payment of any royalties thereon or therefor.

I claim:

1. In a reflector gun sight a housing, a plurality of perpendicularly disposed concave mirrors at opposite ends of the housing with their concave surfaces facing each other, a plurality of plane mirrors abutting each other at right angles and positioned between the concave mirrors and intersecting the focal points of the latter, each plane mirror having a light transmitting opening at one of said focal points, a reticle provided at each opening, luminaries behind the plane mirrors to project an image of the reticles upon the concave mirrors, and a transparent plane reflector upon which the images are reflected so as to appear at infinity, said plane being disposed at an acute angle to the housing.

2. A reflector gun sight comprising a housing, a plurality of plane mirrors arranged at right angles to each other and at an angle of 45 degrees to the housing bottom and each having a light transmitting opening, reticles at the opening in the plane mirrors, a plurality of perpendicularly disposed concave mirrors at the opposite ends of the housing with their concave surfaces facing toward said plane mirrors, luminaries within the angle of the plane mirrors to project images of the reticles to the concave mirrors, said concave mirrors partially collimating and reflecting said images to the plane mirrors, a means disposed in the path of the reflections from the plane mirrors for correction of spherical aberration and coma, and a transparent plane reflector upon which the last reflections are reflected so as to appear at infinity.

THOMAS D. MARTIN.

REFERENCES CITED

The following references are of record in the file of this patent:

UNITED STATES PATENTS

| Number | Name | Date |
|---|---|---|
| 1,958,036 | Draper | May 8, 1934 |
| 1,960,011 | Ives | May 22, 1934 |
| 2,170,979 | Straubel | Aug. 29, 1939 |
| 2,187,057 | Sauer | Jan. 16, 1940 |
| 2,217,930 | Zimmerman | Oct. 15, 1940 |
| 2,295,779 | Epstein | Sept. 15, 1942 |
| 2,377,064 | Aklin | May 29, 1945 |

FOREIGN PATENTS

| Number | Country | Date |
|---|---|---|
| 437,444 | Great Britain | Oct. 28, 1935 |
| 624,129 | Germany | Jan. 13, 1933 |